United States Patent
Ast et al.

(10) Patent No.: US 9,643,265 B2
(45) Date of Patent: May 9, 2017

(54) METHOD AND TOOL FOR PRODUCING A SURFACE OF PREDETERMINED ROUGHNESS

(75) Inventors: Holger Ast, Albstadt (DE); Lutfi Bozkurt, Winterlingen (DE); Peter Sommerfeldt, Hallungen (DE); Horst Reimann, Meschede (DE); Bernhard Gand, Eschweiler (DE); Frank Orlamünder, Anröchte (DE)

(73) Assignees: Guehring KG, Albstadt (DE); Martinrea Honsel Germany GmbH, Munich (DE)

( * ) Notice: Subject to any disclaimer, the term of this patent is extended or adjusted under 35 U.S.C. 154(b) by 821 days.

(21) Appl. No.: 12/362,528

(22) Filed: Jan. 30, 2009

(65) Prior Publication Data

US 2010/0031799 A1  Feb. 11, 2010

(30) Foreign Application Priority Data

Aug. 5, 2008 (DE) .................... 10 2008 036 454
Sep. 12, 2008 (DE) .................... 10 2008 046 944
Nov. 21, 2008 (DE) .................... 10 2008 058 452

(51) Int. Cl.
*B23D 37/22* (2006.01)
*B23B 27/06* (2006.01)
(Continued)

(52) U.S. Cl.
CPC .............. *B23D 37/22* (2013.01); *B23B 27/06* (2013.01); *B23B 27/145* (2013.01);
(Continued)

(58) Field of Classification Search
CPC ... B23P 13/00; B23P 9/00; B32B 3/28; B32B 1/00; F16J 10/00; B21D 43/28
(Continued)

(56) References Cited

U.S. PATENT DOCUMENTS 4,792,265 A  12/1988  Rottler
5,380,564 A  1/1995  VanKuiken, Jr. et al.
(Continued)

FOREIGN PATENT DOCUMENTS

CH  262604 A  7/1949
DE  4214355 A1  11/1993
(Continued)

OTHER PUBLICATIONS

Kretzschmar E.: Das Metallspritzverfahren und seine Anwendung in unserer Wirtschaft; VEB Carl Marhold Verlag Halle (Saale), GDR, 1953, pp. 42-43.
(Continued)

*Primary Examiner* — Moshe Wilensky
(74) *Attorney, Agent, or Firm* — Burr & Brown, PLLC

(57) ABSTRACT

For producing a cylindrical surface that has a surface structure of predetermined geometry suitable for application of material by thermal spraying, a geometrically predetermined groove structure of minimal depth and width is introduced into the surface by a tool embodied as a follow-on tool in that a groove cross-section is processed successively to a final size. In order for the surface to be producible in mass production with constant quality, the groove structure is worked in such that first a base groove is introduced with a groove bottom width that is smaller than the groove bottom width of the finished groove. Subsequently, at least one flank of the base groove is processed for producing an undercut groove profile by a non-cutting action or cutting action wherein the introduced groove structure is deformed in such a way that the groove openings are constricted by upsetting deformations of material.

64 Claims, 5 Drawing Sheets

(51) Int. Cl.

| | |
|---|---|
| *B23B 27/14* | (2006.01) |
| *B23B 29/034* | (2006.01) |
| *B23B 41/12* | (2006.01) |
| *B24B 33/08* | (2006.01) |
| *C23C 4/02* | (2006.01) |
| *B23C 5/20* | (2006.01) |
| *B23D 37/00* | (2006.01) |
| *B23D 37/16* | (2006.01) |
| *B23D 43/00* | (2006.01) |

(52) U.S. Cl.
CPC ........ *B23B 29/03428* (2013.01); *B23B 41/12* (2013.01); *B23C 5/207* (2013.01); *B23D 37/005* (2013.01); *B23D 37/16* (2013.01); *B23D 43/005* (2013.01); *B24B 33/08* (2013.01); *C23C 4/02* (2013.01); *B23B 2200/204* (2013.01); *B23B 2210/027* (2013.01); *B23B 2215/24* (2013.01); *B23B 2215/242* (2013.01); *B23B 2222/04* (2013.01); *B23B 2222/16* (2013.01); *B23B 2226/125* (2013.01); *B23B 2226/315* (2013.01); *B23B 2228/10* (2013.01); *B23C 2200/00* (2013.01); *B23C 2220/36* (2013.01); *Y10T 83/0304* (2015.04); *Y10T 83/9358* (2015.04); *Y10T 407/1906* (2015.01); *Y10T 407/23* (2015.01); *Y10T 409/400175* (2015.01)

(58) Field of Classification Search
USPC .......................................................... 29/557
See application file for complete search history.

(56) References Cited

U.S. PATENT DOCUMENTS

| | | | |
|---|---|---|---|
| 5,622,753 A | 4/1997 | Shepley et al. | |
| 5,931,038 A | 8/1999 | Higashi | |
| 6,394,710 B1 | 5/2002 | Kurz | |
| 7,220,458 B2 | 5/2007 | Hollis et al. | |
| 2003/0223830 A1 | 12/2003 | Bryan et al. | |
| 2004/0045419 A1 | 3/2004 | Bryan et al. | |
| 2005/0044707 A1 | 3/2005 | Izquierdo et al. | |
| 2005/0064146 A1 | 3/2005 | Hollis et al. | |
| 2005/0064746 A1 | 3/2005 | Lin | |
| 2006/0263153 A1 | 11/2006 | Isaksson | |
| 2008/0244891 A1 | 10/2008 | Iizumi et al. | |
| 2009/0175571 A1 | 7/2009 | Boehm et al. | |
| 2010/0326270 A1 | 12/2010 | Doerfler et al. | |

FOREIGN PATENT DOCUMENTS

| | | |
|---|---|---|
| DE | 196 14 328 | 10/1997 |
| DE | 198 02 842 | 8/1998 |
| DE | 102007023418 A1 | 11/2008 |
| DE | 10 2009 028 040 | 2/2011 |
| DE | 10 2009 027 200 | 4/2011 |
| EP | 0 989 197 | 3/2000 |
| EP | 0989197 A1 | 3/2000 |
| EP | 1 225 324 | 7/2002 |
| EP | 2 112 359 | 10/2009 |
| WO | 96/33837 | 10/1996 |
| WO | 98/48964 | 11/1998 |
| WO | 2006/061695 | 6/2006 |
| WO | 2007/087989 | 8/2007 |
| WO | 2008/034419 | 3/2008 |
| WO | 2008/034419 A1 | 3/2008 |

OTHER PUBLICATIONS http://www.tool-tool.com/aviation-dovetail.htm published 2003, 3 pages.
German Office Action from a corresponding German patent application bearing a mailing date of Jan. 12, 2017, 8 pages.

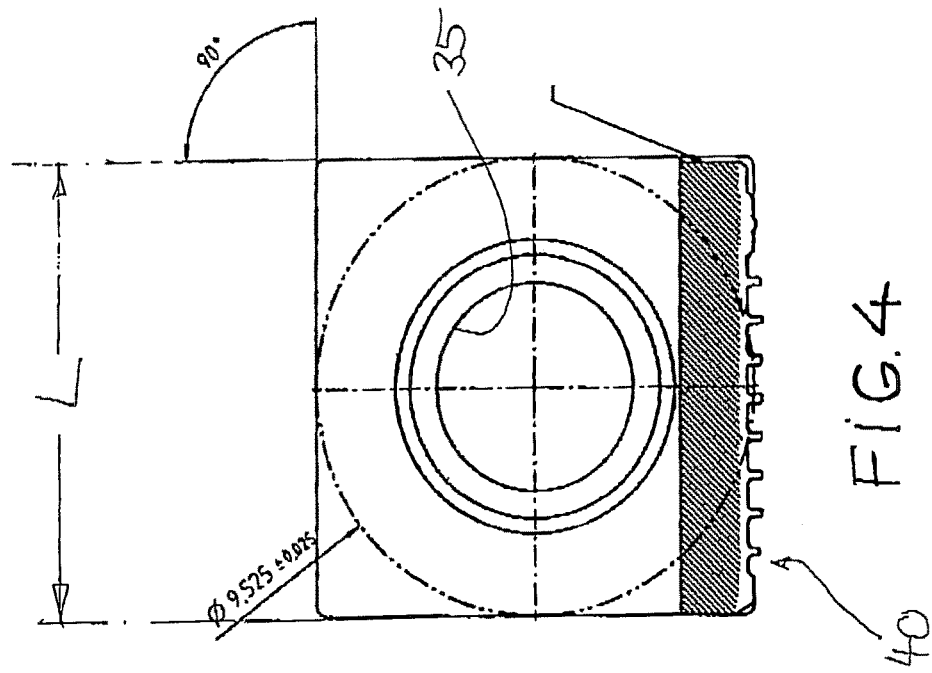
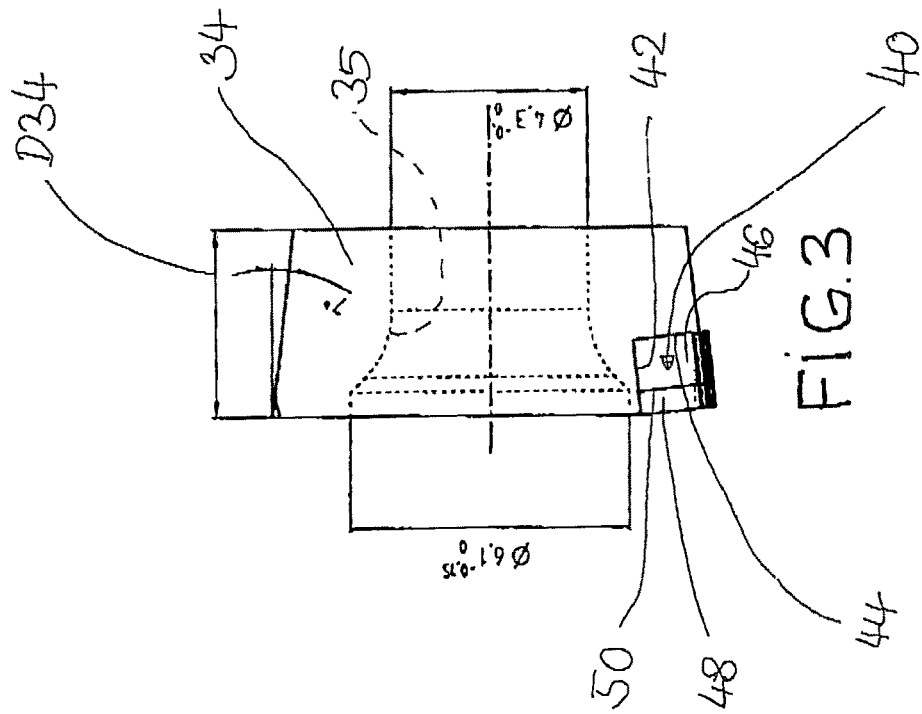

METHOD AND TOOL FOR PRODUCING A SURFACE OF PREDETERMINED ROUGHNESS

BACKGROUND OF THE INVENTION

The invention concerns a method for producing a surface with predetermined roughness, in particular an e.g. cylindrical surface, that has a surface structure of predetermined geometry suitable for application of material by thermal spraying, in which in a substrate surface, preferably premachined to size, a geometrically determined groove structure of minimal depth and width is introduced by means of a tool that is preferably embodied as a follow-on tool, in that a groove cross-section is processed successively to a finished size.

Moreover, the invention concerns a tool for performing such a method as well as a device for performing the manufacturing method. Components of this invention are thus moreover a suitable combination tool, including a honing tool, a manipulation device designed for handling it, as well as a mechanical processing method for a targeted and reproducible manufacture of a defined surface quality and surface geometry.

For solving certain technical problems, in particular tribological problems, it is often desired to coat surfaces of a support material with a material that has defined properties that are matched to the respective conditions of use. In comparison to solutions in which several components are joined either mechanically or by adhesive connections or brazing connection, such coatings have the advantage of an extremely compact construction combined with a relatively large contact surface of the adjoining materials so that such a joining technique is expedient in particular for thermally highly loaded components. By means of the coating an excellent material bonding results so that thermal energy can be dissipated particularly well.

In the field of metallic materials such coatings are often applied by so-called "thermal spraying" wherein, in addition to the so-called flame spraying, recently often the so-called plasma spraying process or arc spraying process has been used. In this connection, powder particles and/or wire particles are thrown or sprayed at high thermal and kinetic energy onto the surface of the substrate to be coated and form thereon, after temperature dissipation, the desired coating.

In addition to precisely maintaining process parameters for avoiding so-called coating porosities, i.e., incorporation of cavities that can no longer be filled or so-called "overspray" where a portion of the molten particles will not adhere to the substrate but will rebound, a decisive factor for a reliable utilization of this manufacturing process is the mechanical interlocking between coating and substrate in order to achieve a satisfactory high level of adhesion of the coating. In such a case there is the need to configure the substrate surface with a surface structure of predetermined geometry so that the layer will mechanically interlock uniformly across the entire surface to be coated. In this connection, it has been found that frequently it is not sufficient to roughen the substrate surface, for example, by sandblasting or waterjet blasting and/or to activate it.

When, for example, an engine block is provided with suitable coatings that are applied by thermal spraying, a wear-resistant and friction-reduced bearing surface is provided.

The applied matrix, for example, steel matrix, is subjected when in use to a significant mechanical loading so that for providing a satisfactory service life it is important to bond the coating strongly to the substrate, for example, in the form of cast aluminum. It is particularly important to process the surface of the material to be coated in such a way that a surface with precisely defined geometric parameters is produced that is particularly suitable for thermal spraying, wherein it must be ensured that the manufacturing process is designed such that the desired surface structure can be produced in a reproducible way with minimal variance in order to ensure satisfactory bonding.

In this connection, it has been considered to process by cutting the substrate surface, for example, of a cast aluminum part, by means of a follow-on tool in that a groove cross-section is successively machined to the final size with cutting teeth that engage sequentially. With currently embodied tools of this type it has been attempted to introduce structures into the premachined cylindrical surface, for example, of cast aluminum. However, in practice this proved to be problematic in that these structures cannot be introduced with constant quality and shaping into the substrate. The adhesion of the coating applied subsequently by thermal spraying varied within too wide a range. Up to now, it has therefore not been possible to employee this method for mass production.

SUMMARY OF THE INVENTION

The invention has therefore the object to further develop a method for producing an e.g. cylindrical surface with predetermined surface structure of the aforementioned kind in such a way that it is suitable for mass production of a substrate surface that is optimally prepared for thermal spraying. A further object resides in that a tool for performing the method is to be provided with which the substrate surface prepared in an optimal way for the application of a material by thermal spraying can be produced in a particularly economical, high-precision manner with minimal shape fluctuations.

Finally, an object of the invention resides in that a device is to be provided for performing the method by employing the tool according to the invention.

These objects are solved with regard to the method in that the groove structure is introduced into the e.g. cylindrical substrate surface in that first a base groove with a groove bottom width that is less than the groove bottom width of the finished groove is introduced into the substrate surface, and that subsequently the groove, for example, at least one flank of the base groove, is processed by a non-cutting action or a cutting action for producing the groove cross-section, in particular an undercut groove cross-section; with regard to the tool in that the tool comprises a support part on which at least one e.g. substantially parallelepipedal shaping and cutting plate is attached that has at least at one lateral edge, that can be aligned parallel to the cylindrical substrate surface to be processed, with at least three comb-like sequentially arranged teeth, of which a first tooth forms a premachining and safety tooth with a first tooth cross section and a first projecting length, at least one second neighboring tooth forms a groove premachining tooth with a second tooth cross-section that is higher than the first cross-section and a second projecting length that is greater than the first projecting length and at least one third tooth neighboring the second tooth forms a shaping tooth (for example, dovetail tooth) with at least one lateral slanted flank by which the tooth head is enlarged to a tooth width that is greater than the tooth width of the tooth that is previously in engagement; and with regard to the device in that the device comprises a tool support that has at least two degrees of freedom of movement, of which one is the advancing direction of the tool and/or of the workpiece parallel to the axis of rotation of the tool or the workpiece and the other determines the advancing direction extending at an angle thereto, wherein the advance can be adjusted to the relative rotary speed between tool and workpiece.

According to the invention, the groove structure in the substrate surface is produced in such a way that first a base groove with a groove bottom width that is smaller than a groove bottom width of the finished groove is worked or cut or shaped into a cylindrical substrate surface, for example. Only thereafter this base groove is further processed in a non-cutting or cutting way such that at least on one side or on one flank of the groove worked into the substrate a contour results that is optimally prepared for the future method step of thermal spraying. Preferably, the at least one flank of the groove is processed in such a way that an undercut or an undercut-like constriction of the groove worked into the surface is produced. As a result of the constriction of the grooves it is possible to provide between substrate and coating an extremely strong interlocking action. By this stepwise incorporation of the groove structure it can be ensured that the same forces will act on the teeth or cutting edges that will subsequently engage.

The tool can be designed according to an advantageous embodiment as a follow-on tool. Further advantageous embodiments are disclosed in the dependent claims.

It is particularly advantageous when the groove that has been produced by non-cutting action or cutting action is deformed in that the worked-in groove openings are constricted by upsetting deformations of material. Advantageously, this upsetting deformation of material can be generated simultaneously with the production of the groove contour and preferably with the same tool. In this way, a particularly effective undercut for creating a strong interlocking action of the spray-on layer to be applied with the cylindrical surface.

It has been found in experiments that this type of groove flank processing reliably ensures that with regard to the tool no so-called "smearing" occurs that, in particular when processing relatively soft materials, for example, aluminum, is responsible for shape imprecision of the groove structure to be produced. In this way, an undercut groove with a groove bottom width of up to 0.18 mm and a depth of approximately 0.14 mm with a groove pitch (groove coil pitch) of approximately 0.7 mm with constant groove geometry was produced on a cylindrical inner surface, wherein it was even achieved to limit the opening of the groove facing the material to be applied to a width of 0.12 mm. In this way, particularly beneficial conditions for the application of a material by thermal spraying are provided, for example, for plasma spraying and for arc spraying.

A particularly advantageous embodiment proposes that the groove is realized by a tool in one working step in different cutting and deformation operations, for example, by means of a follow-on tool, so that the desired surface structure can be produced with simplest kinematics and thus quickly and efficiently.

The stepwise processing according to the invention for forming the final groove shape makes it possible to optimize the surfaces of the groove structure, i.e., the groove flanks and/or the bottom of the groove(s), within wide limits in order to optimize the interlocking action between the substrate and the material to be applied. This is realized, for example, in that the processed surface, produced in that, for generating the groove cross-section, the cutting and deformation process is done such that during material removal the surface is roughened and a microstructuring and/or microundercut and/or microroughness is produced, is provided with a microstructure.

The tool according to the invention for performing the method is characterized in that the teeth of the e.g. parallelepipedal-shaped shaping and cutting plate that produce the groove structure have upstream thereof a preprocessing and safety tooth that has a reduced projecting length in comparison to the subsequent groove processing or shaping teeth. The preprocessing and safety tooth can therefore be used for guiding and stabilizing the shaping and cutting plate upon immersion into the cylindrical substrate surface. The teeth of the follow-on tool in this way will engage with great precision the substrate to be processed. As a result of the stepwise introduction of the groove structure, it is also possible to ensure that constant forces will occur at the teeth or cutting edges that engage subsequently. This not only improves the precision of the groove structure to be produced but also improves the control of loading of the very small teeth of the tool. A tool of such a configuration thus no longer tends to produce the aforementioned "smearing", in particular, in connection with minimal quantity lubrication (MQL), in the area of the fine toothing so that for the first time it has been achieved that the desired micro-groove structure can be mass-produced with narrow tolerance geometry.

Advantageous further embodiments of the method and the tool are subject matter of the dependent claims.

In principle, the method according to the invention can be applied for any surface structures of the substrate to be coated. A particularly powerful embodiment of the method results however when the surface to be coated is a cylindrical substrate surface. In this case, the groove structure can be produced in that at least one coil-shaped groove is worked into the cylindrical substrate surface in that a tool is being used that - similar to a tapping tool - supports comb-like and redundant, sequentially arranged teeth of different cross-section that successively process one and the same groove. In this connection, it can be advantageous to shape or impress the base groove into the cylindrical substrate surface. However, it is also possible as well to produce a base groove by cutting action.

The afore described groove structure is to be configured for preparation of thermal spraying in such a way that the grooves have a very small depth and width. Accordingly, the tool for producing the groove structure must be designed to have a delicate configuration. When accordingly the method is further developed in that the groove structure is produced in that at least one coil-shaped groove is introduced into the cylindrical surface, a single shaping and cutting part furnished with teeth arranged in a comb-like arrangement is sufficient for producing the groove structure. However, it is also possible to produce in the surface a multi-start base groove as well as several grooves with undercut groove cross-section. Because the processing or cutting work steps are carried out redundantly, the special advantage results that even for tool wear a uniform groove geometry can be produced.

When the method step of incorporating the base groove and/or the finished groove structure (cutting and deformation operations) is divided into partial steps, the forces acting on the teeth of the tool can be controlled even better. Because the working or cutting processing steps are thus performed redundantly, the special advantage results that even when the tool is worn a uniform groove geometry can still produced.

An especially advantageous substrate surface that has an optimal structure for the subsequent application of a material by thermal spraying results when in the cylindrical surface between the at least one groove generated previously with the same tool an intermediate groove is formed so that undercut-like material deformations in the previously produced groove structure are generated. As a result of plastic forming, i.e., displacement of substrate in the substrate surface to be provided with the groove structure, not only an intermediate groove is produced that increases the contact surface between the substrate and the material to be applied by thermal spraying. Moreover, the displacement of the substrate material between the depressions of the groove causes a sufficient narrowing of the groove opening so that the sprayed-on layer will interlock particularly effectively and intensively with the substrate material.

The tool can be embodied purely as a forming, cutting or honing tool or also as a tool that combines different processing methods, for example, cutting and forming or honing and forming or cutting and honing. For example, it can also be advantageous to utilize the tool configuration of a honing tool, for example, a cylinder hone, with radially adjustable tool inserts by employing an expander cone for positioning the cutting edges. In the embodiment as a honing tool preferably several cutter parts, such as honing stones, are distributed uniformly about the circumference and serve as supports for an abrasive material, i.e., abrasive grain, that is advantageously comprised of diamond (PCD) or boron nitride or other comparable shape-stable materials. The abrasive grain that projects from the bonding material (ceramic, metallic, or synthetic resin) has in this case additionally a predetermined geometry that changes in a predetermined way across the axial length of the honing stone so that with adjustment of the axial advancing movement to the relative rotational movement between honing stone and substrate the above described step-wise working of the defined groove structure is possible.

According to a variant it can also be provided to subject the honing stone during the axial relative movement relative to the substrate surface to a radial advancing movement so that the grooves that have been produced by a leading section of the honing stone(s) are gradually ground to full depth.

With a tool configuration according to the example of a honing tool the grooves are therefore steeper and they can even intersect, as a result of the normally provided reciprocating movement of the honing tool. It is even possible in principle to design the honing stones such that displacement projections follow the abrasive grain in a predetermined position that is matched to the kinematics of the honing process so that in this connection the aforementioned undercut-like groove, can be produced by material displacement.

It has been proven in experiments that the most important parameter for excellent and permanent adhesion of a layer applied by thermal spraying is the mechanical interlocking between layer and substrate. According to the embodiment of the method, wherein in the cylindrical surface between the at least one groove generated previouslywith the same tool an intermediate groove is formed so that undercut-like material deformations in the previously produced groove structure are generated, or the embodiment of the tool, wherein adjacent to the at least one shaping tooth embodied e.g. as a dovetail tooth on the side facing away from the safety tooth additionally a displacement tooth is formed that has across a predetermined length a projecting length corresponding to that of the safety tooth and preferably has at its center section a preferably rounded projection, this mechanical interlocking can be ensured even when the at least one flank of the groove worked into the substrate surface is undercut only slightly or not at all.

The embodiments of the tool for performing the method ensure that the tool and particularly the parallelepipedal shaping and cutting plate that is employed are provided with a particularly long tool life travel. When, for example, a tool is provided with several preferably neighboring shaping teeth with which different flanks of the e.g. undercut groove to be formed can be processed, the several preferably adjacently positioned cutting and impressing teeth cause the forming action and sequentially different flanks of the groove to be formed, for example, with undercuts, can be processed, so that reduced cutting forces at the individual teeth and thus greater service life of the tool will result.

In the embodiment wherein tool is characterized in that, adjacent to the at least one shaping tooth embodied e.g. as a dovetail tooth on the side facing away from the safety tooth, additionally a displacement tooth is formed that has across a predetermined length a projecting length corresponding to that of the safety tooth and preferably has at its center section a preferably rounded projection, the tool becomes a cutting and forming tool. With an appropriate configuration of the displacement tooth, i.e., by providing the displacement tooth across a predetermined length with a projecting length matching that of the safety tooth, the material that is displaced by the rounded projection is displaced mandatorily toward the cut groove so that the groove opening that is facing the material to be applied is additionally constricted. The projecting length of the displacement tooth and thus the projecting length of the safety tooth is selected preferably such that the forming and cutting plate can be introduced with clearance fit or slight press fit into the prepared bore, i.e., into the prepared substrate bore. Preferably, the safety tooth has a width that is a multiple of the width of the least one groove premachining tooth or the at least one shaping tooth (for example, dovetail tooth). In this way, the guiding action of the shaping and cutting plate and thus the working precision of the tool is further improved.

As already mentioned above, for producing the groove structure with exactly predetermined geometry it is important to introduce the groove or grooves with highest precision in such a way that even after long tool life travel of the shaping and cutting plate no uncontrolled substrate deposits between the teeth, i.e., no so-called "smearing", will result, which in particular for processing relatively soft materials such as aluminum can result in greater fluctuations of the formed groove geometry and in shape deviations. It has been found that in particular for a tool configuration wherein the shaping teeth are comprised of wear-resistant material, preferably, steel or hard material, or wherein the shaping teeth are formed in a cutting insert that has the shape of a prism block or parallelepipedal block and is comprised of a composite part in which a hard material, for example, PCD plate, is seated on a support comprised e.g. of hard metal, preferably attached by brazing, wherein the shaping teeth extend across the separating plane of the two materials, it can be reliably achieved that the groove structure is mass-produced with constant quality while long tool life travel of the tool is ensured.

When the cutting insert is formed by a composite part in which a hard material plate, in particular of polycrystalline diamond (PCD), is seated on a support part, preferably a hard metal support, the teeth can be configured to be very delicate with greatest possible precision so that optimal cutting conditions are provided in particular where smallest chip volumes or chip cross-sections occur. Still, the tool is highly loadable because the support or hard metal support that supports the hard material or PCD plate imparts to the tool the required stability, rigidity, and resilience. Preferably, the teeth are eroded into the composite plate. In this way, it is possible without problems to configure the shaping teeth to extend across the separating plane between hard metal support and PCD plate in a continuous way.

In the embodiment wherein the cutting insert is positively in a cutting plate that is embodied, e.g., as an indexable insert, preferably is brazed, or wherein the cutting plate is supported by a holder that is seated adjustably on a tool module in such a way that the cutting insert can be aligned substantially parallel to the axis of the circular-cylindrical surface to be processed, an advantageous fine adjustability of the shaping teeth is provided so that it is possible to distribute the loads onto the teeth machined with high precision as uniformly as possible.

BRIEF DESCRIPTION OF THE DRAWINGS

In the following with the aid of schematic drawings several embodiments of invention will be explained in more detail. It is shown in:

FIG. 3 on a greatly enlarged scale the section according to "III-III" through a indexable insert that is provided with cutting insert for producing the surface structure;

FIG. 4 the plan view of the indexable insert according to "IV" of FIG. 3;

DESCRIPTION OF PREFERRED EMBODIMENTS

In the following a tool will be described with which a cylindrical inner surface of a substrate, in particular a bore of an engine block that has been prepared to size or premachined can be worked in such a way that a layer can be applied by a thermal spraying method in mass production. By means of this material application by so-called thermal spraying a liner, for example, of steel with traces of other elements, is to be produced, in particular in the form of a matrix with embedded oxide nests and very fine pores. The finished thickness of this layer should then be approximately 0.1 to 0.2 mm wherein after honing this layer exhibits a very smooth surface with very fine pores.

In order for the material applied by thermal spraying to adhere well on the substrate, i.e., a cast aluminum material, it is required to provide the substrate with a special surface so that interlocking between the material layer applied by thermal spraying and the cast aluminum can be realized across the entire substrate surface in a reproducible way and with constant excellent quality. The cylindrical inner surface of the cast aluminum substrate, for example, in case of producing cylinder liners of internal combustion engines, has an axial length of approximately 130 mm and extremely tight cylinder shape tolerances and surface roughness must be complied with. The tool according to the invention is configured such that it produces in the already very precisely premachined cylindrical substrate surface at least one coil-shaped groove with predetermined geometry; this will be explained in the following in more detail.

Figure 2:
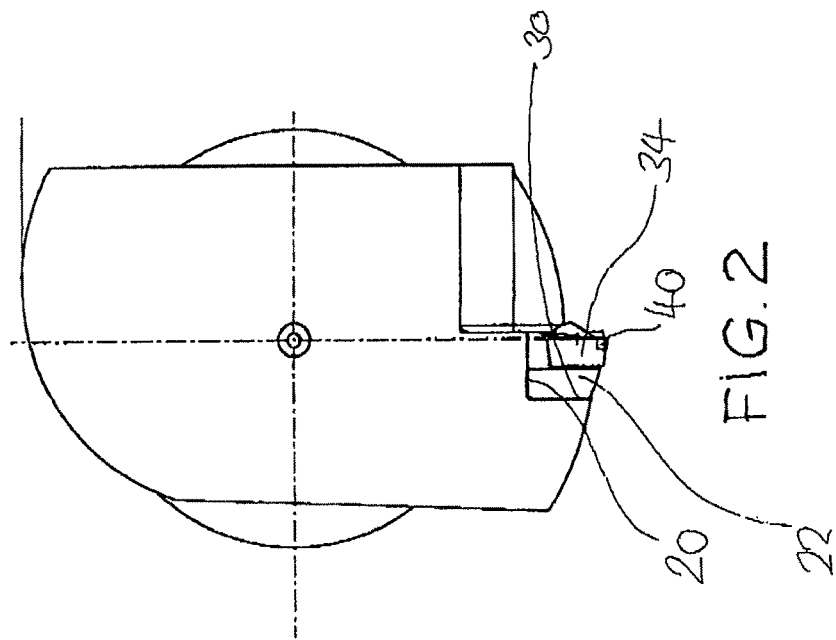
FIG. 2 an end view of the tool according to FIG. 1 according to "II" in FIG. 1.
Figure 1:
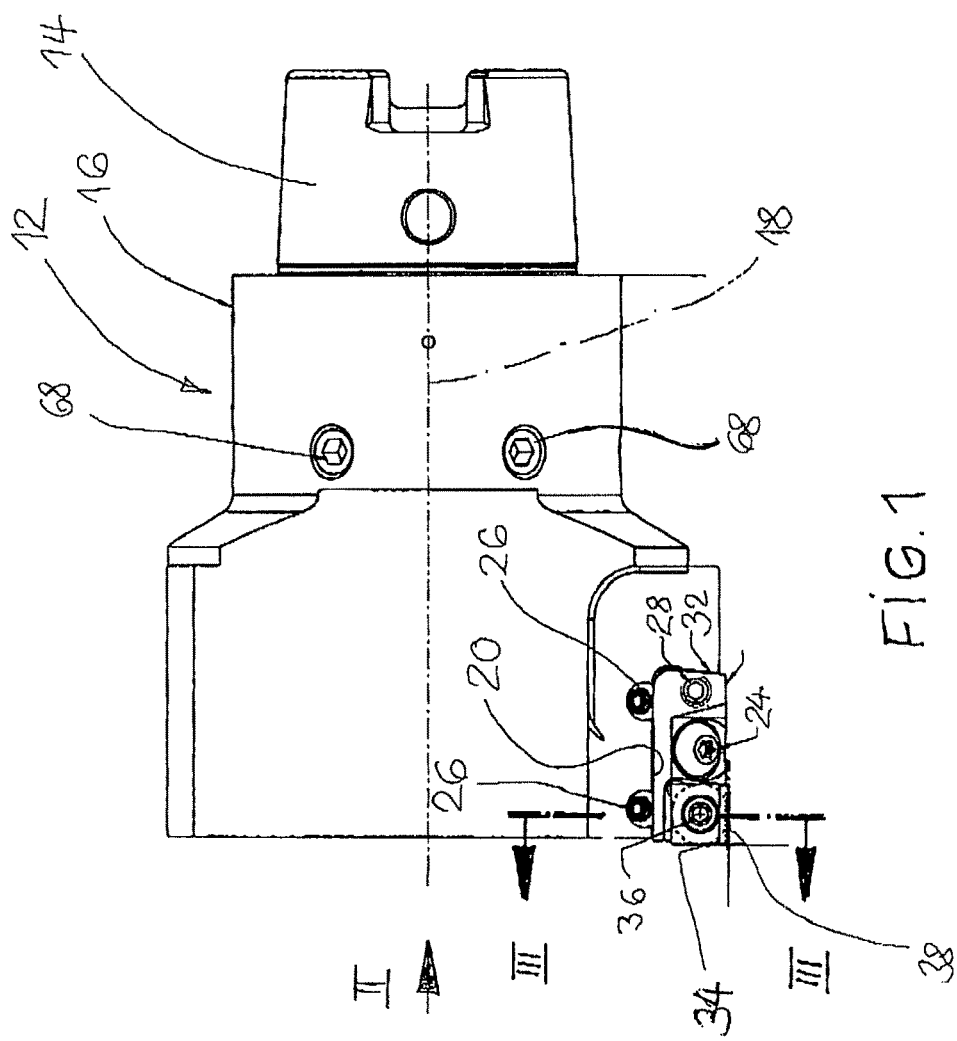
FIG. 1 a side view of a first embodiment of the tool for producing a cylindrical inner surface that has a surface structure of predetermined geometry prepared for application of material by thermal spraying.
Figure 5:
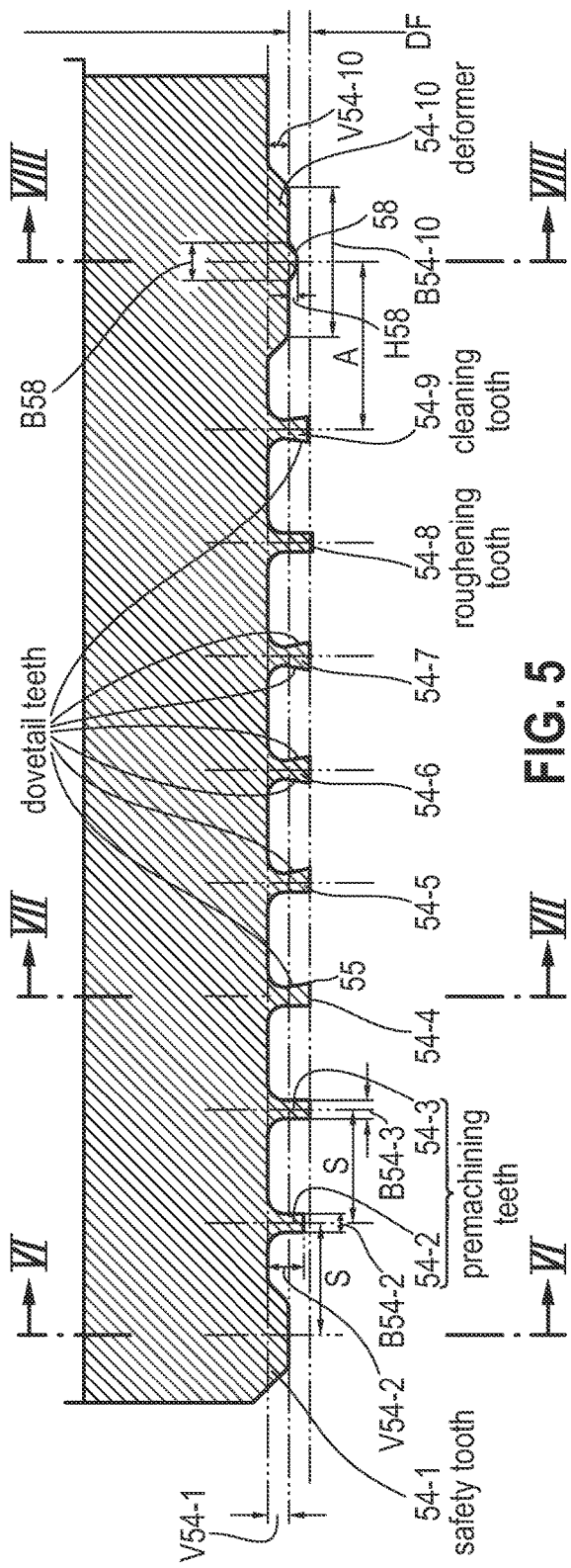
FIG. 5 on a greatly enlarged scale the plan view of the cutting insert of the embodiment according to FIG. 4.

The entire tool is illustrated in FIG. 1 and referenced by reference numeral 12. It comprises a clamping shaft 14 with a hollow shaft taper (HSK) adjoined by a base member 16. The axis of the tool 12 is identified at 18 and it can be seen in this illustration that the tool 12 is an extremely rigid and shape-stable tool which is a prerequisite for being able to machine a cylindrical inner surface of the cast aluminum with the predetermined cylinder shape precision.

In a pocket referenced at 20 there is a tool holder 22 that is substantially in the shape of a parallelepiped and by means of a clamping screw 24 can be clamped against two inner surfaces of the pocket 20 positioned at an angle to one another. The reference numeral 26 identifies eccentric pins that, by means of suitable tools, for example, a hexagon socket wrench, can be turned in order to align the holder 22 relative to the axis 18. It is understood that therefore the clamping screw 24 penetrates a corresponding bore in the holder with play and at an angle to the two contact surfaces of the pocket 22 so that such fine adjustments of the tool holder 22 are possible.

With reference numeral 28 a threaded pin is identified which, not illustrated in detail, is supported on a support surface 30 of the pocket 20 so that the holder 22 with contact on the radially inwardly positioned support surface of the pocket 20 is pivotable in a plane parallel to the axis 18.

It can also be provided that the holder 22 is secured so as to be adjustable in axial direction, preferably fine-adjustable, by means of an adjusting bolt, not illustrated in detail, that is in contact with an end face 32 of the holder 22 and is pressed or screwed substantially radially into the base body 16.

The tool holder 22 supports the indexable insert 34 that, by means of a central fastening screw 36 interacting with a penetration 35 of the indexable insert, is secured in a detachable way on the tool holder 22.

The indexable insert 34 is comprised of a suitable support material, for example, steel, in particular tool steel. However, it supports on one lateral edge 38, that is parallel to the tool axis 18 and thus to the cylindrical substrate surface, a cutting insert 40 that substantially extends across the entire length of the indexable insert 34. For describing the details reference is being had in the following to FIGS. 3 and 4.

It can be seen that the indexable insert 34 in the area of the lateral edge 38 has a recess delimited by two surfaces 42, 44 positioned at a right angle to one another, into which, preferably by brazing, the cutting insert 40 in the form of a parallelepiped with substantially square cross-section is fixedly inserted. FIGS. 3 and 4 show the indexable insert with cutting insert on a greatly enlarged scale. The illustration however shows that the indexable insert 34 only has a thickness D34 of approximately 4 mm and an edge length of approximately 9.5 mm. Accordingly, the cross-section of the cutting insert 40 is accordingly small with an edge length of approximately 1.1 mm.

The cutting insert 40 is a composite part wherein a cutting plate 48 of polycrystalline diamond (PCD) is fixedly seated on a hard metal support 46. The connection between the parts 46 and 48 is realized by means of brazing. The planar separating plane between the hard metal support 46 and the cutting plate 48 or the PCD cutting plate 48 is identified by reference numeral 50.

In particular the illustration of FIG. 4 shows that the PCD cutting plate 48 is shorter by a size K then the cutting edge length of the hard metal support 46 so that in this way it is possible to eliminate the risk of damage in regard to the relatively brittle PCD cutting plate 48. In FIG. 4 the PCD cutting plate is indicated by cross-hatching.

Moreover, it can be seen that the cutting insert 40 is provided with an extremely delicate toothing that makes it possible to work a groove structure with precisely predetermined geometry, for example, into a cylindrical surface of a cast aluminum part with any diameter, for example, the bore diameter of an internal combustion engine cylinder. In this connection, at least one groove is to be produced that extends like a thread across the entire axial length of the cylindrical substrate surface and has, for example, a depth T (see FIG. 10) of less than 0.15 mm and a width B in the range of maximally 0.2 mm. The pitch S of the groove 52 (see FIG. 10) is approximately 0.5 to 0.8 mm.

For producing this groove 52 with a geometry according to FIG. 10 the cutting insert 40 is provided with a special toothing that will be explained in the following with reference to FIGS. 5 to 8 in more detail.

FIGS. 5 to 8 show the plan view and section illustrations of the cutting insert 40 at a greatly enlarged scale. The total length L of the cutting insert 40 is approximately 9 to 10 mm. The width B40 of the cutting insert 40 is approximately 1 mm, likewise the entire height H40. One can see in the illustrations according to FIGS. 6 to 8 that the PCD cutting plate 48 only has a thickness H48 of approximately 0.3 to 0.4 mm while the hard metal support 46 has a thickness H46 between 0.6 and 0.7 mm. The teeth identified by reference numerals 54-1 to 54-10 are preferably eroded into the lateral surface of the cutting insert 40 across its entire height with the following geometry.

At the axially leading end area there is first a safety tooth 54-1 that projects by a height V54-1 from the tooth root surface. The height V54-1 is selected such that the tooth head of the safety tooth 54-1 for a finish-adjusted tool holder 22 is substantially positioned at the cylinder running surface diameter, i.e., the premachined inner diameter of the substrate to be coated. The width B54-1 of the safety tooth is approximately 0.3 mm.

Adjacent to the safety tooth 54-1 there follow at a spacing of the pitch S, respectively, two premachining teeth 54-2 and 54-3. The premachining tooth 54-2 has a substantially narrower tooth cross-section that however projects at a greater projecting length V54-2 from the edge of the cutting insert 40. In other words, the first premachining tooth 54-2 emerges by the predetermined length into the prepared substrate surface and generates a base groove that is indicated in FIG. 10 in dash-dotted line 52B.

Figure 10:
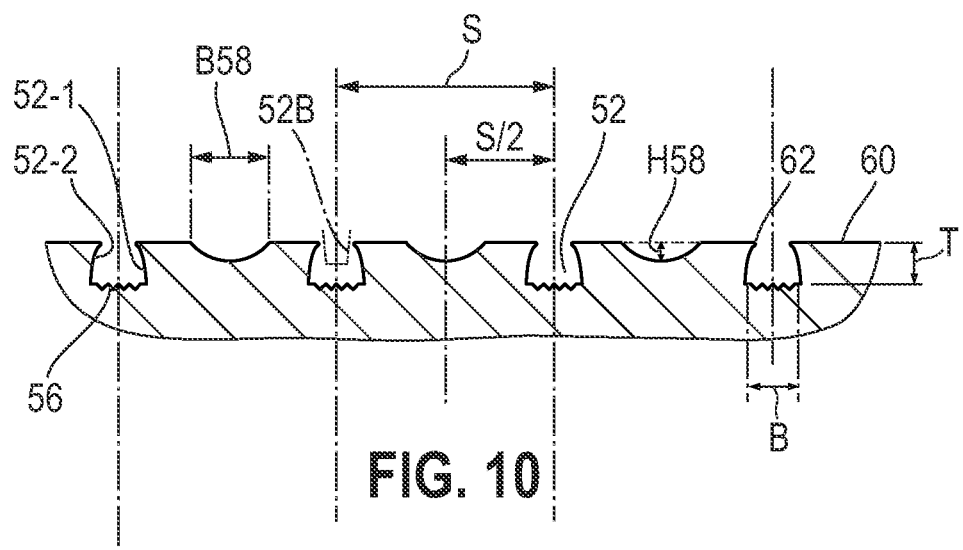
FIG. 10 in a greatly enlarged illustration a part-sectional view of the substrate surface structure producible with the described tool.
Figure 10A:
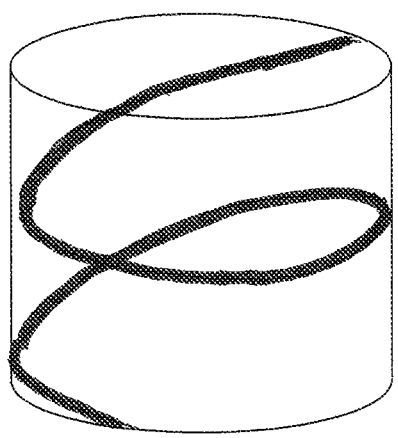
FIG. 10a shows purely schematically a coil-shaped groove in a cylindrical surface.

The shape of the first premachining tooth 54-2 is however such that the width B54-2 of the tooth head is smaller than the width B of the finished groove 52 (compare FIG. 10). Also, the projecting length V54-2 is selected such that it not yet reaches the diameter DF of the finished contour of the groove 52. Only by means of the second premachining tooth 54-3 the base groove is cut to the full depth T (compare FIG. 10) wherein however the width of the groove is substantially kept at the size B54-2 of the first premachining tooth 54-2.

Each displaced by the pitch S of the groove 52 to be produced, so-called shaping teeth follow that in the following are referred to as "dovetail teeth" 54-4 to 54-7. However, it should be noted that these shaping teeth must not mandatorily have a flank that upon immersion into the substrate generate an undercut groove. The shaping teeth can moreover work by cutting action as well as in a non-cutting action.

In the illustrated embodiment the dovetail teeth 54-4 to 54-7 widen the previously formed base groove in the area of the groove bottom successively to the final size B (see FIG. 10). In this connection, the dovetail teeth 54-4 and 54-5 shape, i.e., cut, the groove at one flank to an undercut groove shape while the following dovetail teeth 54-6 and 54-7 form the other flank of the groove in that they carry out a cutting operation. After engagement of the last dovetail tooth 54-7 an undercut groove 52 with a contour according to FIG. 10 is present, i.e., with a depth T and a width B at the groove bottom. Instead of the cutting operation it is also possible to perform a non-cutting shaping by shaping teeth.

Again displaced by groove pitch S a so-called roughening tooth 54-8 follows the last shaping tooth or dovetail tooth 54-7 and generates with its tooth head a ribbing structure, i.e., a roughened structure 56 with a defined groove depth within the range of 1/100th mm.

A so-called cleaning tooth follows the roughening tooth 54-8, or a further displacement tooth 54-10 to be described infra, and removes possibly present chips in the cut groove. The cleaning tooth is referenced with the reference numeral 54-9 and has a tooth height that is less than the tooth height of the shaping teeth 54-4 to 54-6 so that the roughened structure 56 will not be contacted.

The row of the arranged teeth 54-1 to 54-9 is completed by a so-called displacement tooth 54-10. This tooth has a tooth head width B54-10 that is a multiple of the width of the premachining or shaping teeth. Preferably at the center of the displacement tooth 54-10 with projecting length V54-10, corresponding substantially to the projecting length V54-1 of the safety tooth 54-1, the displacement tooth 54-10 forms a rounded projection 58 that, for example, has a width B58 of approximately 0.1 mm and a height H58 of approximately 0.05 mm. Since the tooth height V54-10 of the displacement tooth 54-10 is selected such that it contacts more or less the inner surface of the substrate premachined to size, the displacement tooth 54-10 displaces with its projection 58 the relatively soft material of the substrate, for example, the material of cast aluminum, in a lateral direction so that the undercut groove 52 in the area of the transition into the inner surface 60 is further constricted by upsetting deformations 62 of material. Moreover, the displacement tooth ensures a reproducible and wear-compensating roughening depth.

As can be taken from the preceding description, the projection 58 is positioned at axial spacing A to the cleaning tooth 54-9 which spacing differs from the groove pitch S. For example, it is 1.5 times the groove pitch S.

Figure 8:
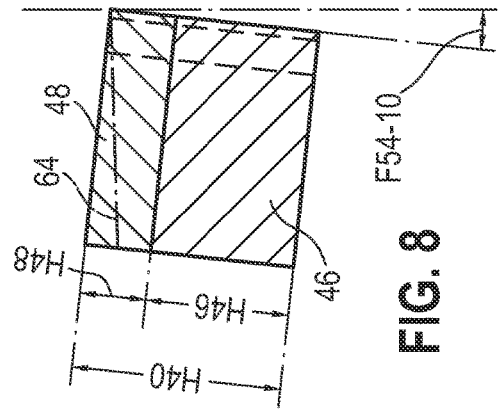
FIG. 8 the section according to "VIII-VIII" of FIG. 5.
Figure 7:
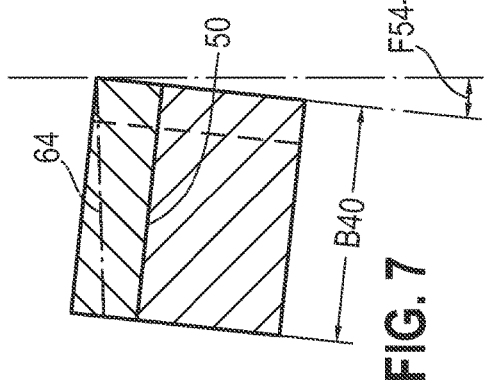
FIG. 7 the section according to "VII-VII" of FIG. 5.
Figure 6:
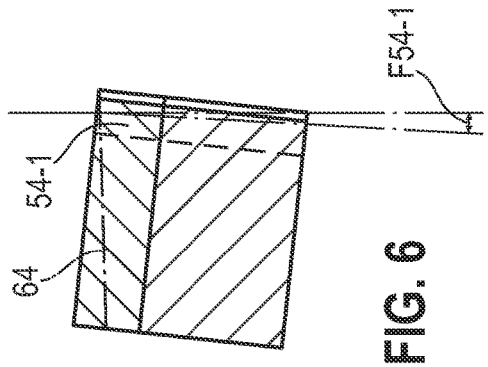
FIG. 6 the section according to "VI-VI" in FIG. 5.

From the section illustrations of FIGS. 6 to 8 it can be taken that the teeth 54-1 to 54-10 engage the substrate. It can be seen e.g. in FIG. 6 that the relief angle F54-1 of the safety tooth 54-1 has a value that is slightly above 0 degrees. It can even be negative. The relief angle F54-4 is definitely positive when the shaping teeth process the inner surface of the substrate by a cutting operation. Likewise, the rake angle of the premachining teeth, of the roughening tooth 54-8 and of the cleaning tooth 54-9 is then also positive. In contrast to this, the relief angle F54-10 of the displacement tooth 54-10, in particular in the area of the projection 58 is significantly smaller. It can even be negative so that the displacement tooth 54-10 with the projection 58 will not cut but will displace or deform material of the substrate.

Furthermore, it can be seen in the illustrations according to FIGS. 6 to 8 that the wedge angle of the cutting insert 40 is substantially 90 degrees so that in the illustrated embodiment a slightly negative rake angle results.

As can be seen moreover in the illustrations according to FIGS. 6 to 8, the teeth 54-2 to 54-9 are machined into the cutting insert 40, i.e., into the hard metal support with brazed-on PCD cutting plate, preferably by erosion, so that across the entire height H40 a uniform tooth height results. However, this does not apply to the tooth configurations in the area of the safety tooth 54-1 and of the displacement tooth 54-10 where the tooth height slightly increases with increasing spacing from the cutting edge corner.

With the afore described configuration of the tool the following action results for generating the cylindrical inner surface with predetermined surface structure.

The tool 12 is aligned with its axis 18 concentrically to the axis of the premachined cylinder running surface so that the radial spacing of the tooth head of the safety tooth 54-1 corresponds substantially to half the cylinder running surface diameter of the substrate surface. When the holder 22 has been aligned prior to this by means of the adjusting possibilities (eccentric pins 26, threaded pin 28) such that the tooth heads of the shaping teeth 544 to 54-7 are substantially parallel to the tool axis 18 in such a way that the tooth line is perpendicular to the coil-shaped groove to be produced, the tool can be moved into the inner bore. Subsequently, a relative rotational movement between the tool 12 and the substrate cylinder surface is generated and at the same time an axial relative displacement between tool 12 and substrate in such a way that the following applies:

$$V_R = n_R \times S$$

wherein $V_R$ is the axial relative speed between the tool 12 and the substrate and $n_R$ is the relative rotary speed between tool and substrate.

Supra, the tool or the toothing of the tool has been described in the area of cutting insert 14 in an embodiment in which the teeth have the same cross-section across the entire height H40 of the cutting insert 40. However it should already be mentioned at this point that the this is not mandatory. It is instead also possible to undercut the teeth, in particular the premachining teeth 54-2 and 54-3 as well as the shaping teeth 54-5 to 54-8, at least in the area of the leading flank in such a way that a positive lateral rake angle for cutting of the groove profile is provided.

As soon as the premachining tooth 54-2 has cut or shaped the base groove with groove bottom B54-2, the additional premachining tooth 54-3 begins to work which machines or cuts the base groove to the full depth T. The premachining tooth 54-3 can be omitted so that the first shaping tooth 54-4 will begin to work. This first shaping tooth 54-4 cuts a first undercut flank 52-1 in such a way that a somewhat wider groove bottom results. This groove bottom is recut by the second shaping tooth 54-5 so that the groove bottom on one side has been cut to full width B/2. Subsequently, the shaping teeth 54-6 and 54-7 complete by stepwise cutting the other undercut flank 52-2 and subsequently the roughening tooth 54-8 produces the roughened section 56.

In the afore described embodiment the premachining tooth 54-2 as well as the premachining tooth 54-3 are embodied as a combination tooth that cuts as well as produces roughness. It is however also possible to design the premachining teeth 54-2 and 54-3 as shaping and deforming teeth, i.e., as teeth that only displace the soft material of the substrate.

The embodiment according to FIGS. 1 through 8 shows the insert of the cutting insert part 40 in a rectangular recess (FIG. 3) with the surfaces 42 and 44 that are oriented such that for a parallelepipedal design of the cutting insert 40 a negative rake angle results. The dash-dotted line 64 therefore indicates in FIGS. 6-8 a surface that is produced when the topside of the cutting insert 40 is removed at a slant to the hard metal support 46 so that a positive rake angle is formed.

Figure 9:
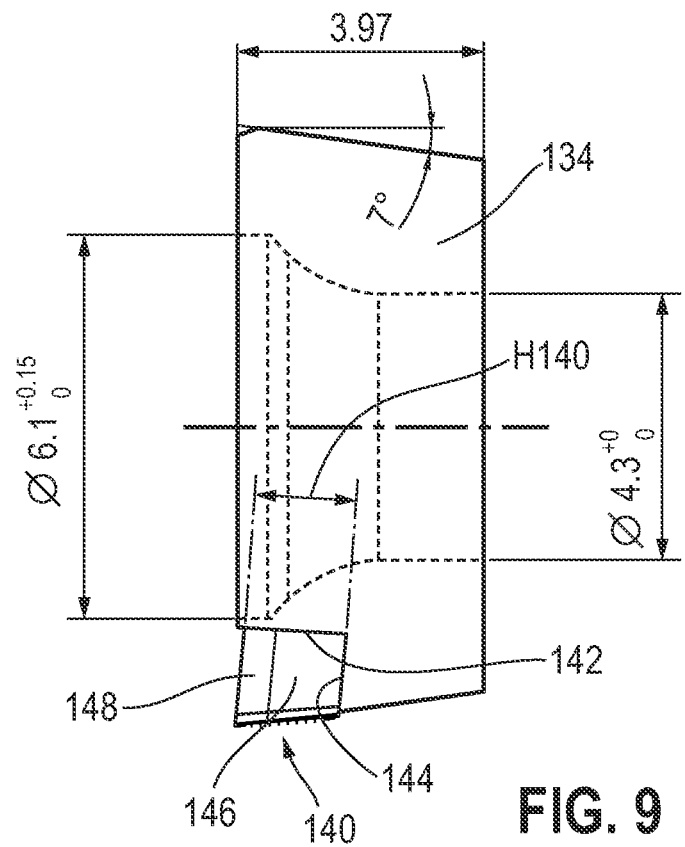
FIG. 9 in a view similar to FIG. 3 a further embodiment of the indexable insert with a modified cutting insert.

FIG. 9 shows a variant of the tool, more precisely of the indexable insert with brazed-on cutting insert in which a wedge angle smaller than 90 degrees with positive rake angle and positive wedge angle can be achieved even when the hard metal support as well as the PCD cutting plate have plane-parallel edge surfaces which ensures a simplified manufacture. For simplifying the description, those components that corresponds to the elements of the afore described embodiment are provided with similar reference numerals that however have a "1" placed in front.

It can be seen that the indexable insert 134 has a differently oriented recess for the cutting insert 140. The surfaces 142 and 144 are still positioned at a right angle to one another but the bottom surface 144 is slanted in opposite direction relative to the bottom surface 44 of the embodiment according to FIG. 3. When accordingly from a parallelepipedal cutting insert 140 with hard metal support 146 and PCD cutting plate attached thereto by brazing and with an edge length H140 a toothing is produced by erosion with the geometry according to FIG. 5, with simple manufacturing-technological measures in the area of the premachining teeth and the shaping teeth a positive relief angle can be produced while in the area of the safety tooth and of the displacing tooth by corresponding control of the erosion tool a reduced relief angle or a negative relief angle can be realized.

It has been demonstrated by large scale experiments that a tool constructed in accordance with the aforementioned criteria was able to introduce reproducibly a groove structure with the geometry according to FIG. 10 in the premachined cylindrical inner surface of cast aluminum wherein even after long tool life travel of the tool no aluminum smearing resulted. In this way, on the inner surface of the cast aluminum substrate a surface was produced that was excellently suitable for application of a sprayed-on layer.

It has been found to be decisive in this connection that the cutting insert embodied as a follow-on tool can be very precisely machined and as a result of the composite configuration is imparted with an improved stability at the important locations so that the cutting edges work exactly and reliably for a long period of time. As a result of the combination of the cutting and impressing teeth the undercut of the groove 52 can moreover be significantly enhanced so that the mechanical interlocking or engagement between the applied material and the aluminum substrate is significantly improved.

Of course, deviations of the afore described examples are possible without deviating from the principal ideas of the invention. For example, instead of the hard material PCD also another hard material, for example, cubic boron nitride (CBN) or also CVD diamond can be employed. It would also be possible in the area of cutting edges to work with different hard materials, for example, cermet materials.

The invention is also not limited to providing a cylindrical inner surface with a groove structure of predetermined geometry. In the same way, an outer surface or even a planar surface can be provided with a corresponding groove structure wherein a method as afore described can be used. The tool in this case would be embodied as a planing or broaching tool in which the teeth will machine sequentially the groove to the full cross-section like a follow-on tool.

The afore described tool has teeth that extends substantially in the circumferential direction, i.e., the cutting insert 40 is provided with straight toothing. It is also possible to provide the teeth so as to be slightly slanted.

In deviation from the afore described embodiment it is also conceivable to furnish the tool 12 with several cutting inserts that are distributed about the circumference; in this case the grooves could then be introduced like a multi-start thread into the substrate, i.e., shaped or cut. This modification of the tool leads to a kind of honing tool wherein the honing stones, that can extend across a significant length or across the entire length of the surface to be machined, are to be provided with a suitable geometry for producing the groove structure.

The tool can also be embodied purely as a shaping, cutting or honing tool or also as tool that combines the different machining types, for example, cutting and shaping and/or honing and shaping and/or cutting and honing. It can also be advantageous to utilize the tool configuration of a honing tool, for example, a cylinder hone, with radially adjustable tool inserts with the aid of an expander cone for positioning the cutting edges.

In regard to the configuration of the honing tool, preferably several cutting parts distributed uniformly about the circumference, for example, honing stones, are used that serve as a support for an abrasive material, i.e., abrasive grain, that preferably is comprised of diamond (PCD) or boron nitride or other comparable shape-stable materials. The abrasive grain that projects from the bonding material (ceramic, metallic or synthetic resin) is provided in this case additionally with a predetermined geometry or spatial shaping that in a predetermined way changes such across the axial length of the honing stone that by adjusting the axial advancing movement to the relative rotational movement between honing stone and substrate the above described stepwise or gradual incorporation of the defined groove structure is enabled. The envelope of the abrasive material in this case is a conical wall so that the leading abrasive grains in the advancing direction project less from the bonding material than the following abrasive grains. When the honing stones perform an axial reciprocating movement this envelope is in the form of a double cone that tapers in both axial directions away from the axial center.

According to a variant it can also be provided that the honing stone during the axial relative movement relative to the substrate surface is subjected to a radial advancing movement so that the grooves that are introduced by the leading section of the honing stone(s) are ground gradually to full depth. In this case, the envelope of the abrasive material can be in the form of a cylinder wall.

In a tool construction according to the embodiment of a honing tool the grooves become steeper and they can also intersect, as a result of the normally provided reciprocating movement of the honing tool. It is even principally possible to design the honing stones in such a way that displacement projections are arranged behind the abrasive grains in predetermined positional relation matched to the kinematics of the honing process so that also the undercut-like groove constriction that has been explained in connection with the method wherein the worked-in groove structure is deformed in such a way that the groove openings are constricted by upsetting deformations of material can be achieved by material displacement.

When the tool according to FIG. 1 is furnished with a single indexable insert, it can be advantageous to provide the base body 16 with guide ledges distributed about the circumference that ensure that the tool in cooperation with the safety tooth is guided safely in the substrate bore.

In order not to impair the required shape precision of the cylinder, FIG. 1 shows two balancing screws referenced by reference numeral 68 with which a fine balancing of the tool is possible.

In a further modification of the afore described tool it is also possible to impress the groove as a whole, i.e., also the area of the undercut flanks.

The invention therefore provides a method for producing a preferably cylindrical surface that has a surface structure of predetermined geometry suitable for application of material by thermal spraying. In this connection, a geometrically determined groove structure of minimal depth and width is introduced into a preferably cylindrical surface of a substrate to be coated that has been preferably premachined to size in that a groove cross-section is successively processed to the final size. This processing is done according for example by a follow-on tool. In order for the surface to be producible in mass production with constant quality, the method is design such that the groove structure is worked in such that first a base groove with a groove bottom width is introduced that is less than the groove bottom width of the finished groove. Subsequently, the groove, for example, at least one of the flanks of the base groove, is processed for producing an undercut groove profile by a non-cutting action or a cutting action, wherein preferably the worked-in groove structure is deformed in such a way th at the groove openings are constricted by upsetting deformation of material.

What is claimed is:

1. A method for producing a surface that has a surface structure of predetermined geometry, that is suitable for application of material by thermal spraying and is in the form of a geometrically determined groove structure, the method comprising:

forming at least a first groove having a final cross-sectional contour in a surface of a structure by sequentially contacting locations on the surface of the structure with at least a first cutting tool and a second cutting tool of a cutting plate, the cutting plate is a single unitary piece of material comprising at least the first cutting tool and the second cutting tool, the first cutting tool is a first projection, the second cutting tool is a second projection, the first projection is separate from the second projection, the first projection is spaced from the second projection, said contacting locations on the surface of the structure with the first cutting tool causing material to be removed from the structure, the first groove having a first cross-sectional contour at each said location after said contacting the structure with the first cutting tool, said contacting the structure with the second cutting tool causing material to be removed from the structure, the first groove having a second cross-sectional contour at each said location after said contacting the structure with the second cutting tool, the final cross-sectional contour comprising a portion of the first cross-sectional contour and a portion of the second cross-sectional contour, said forming at least the first groove is realized in one working step that comprises different cutting and plastic deformation operations.

2. A method as recited in claim 1, wherein the surface is cylindrical and wherein the locations on the surface of the structure comprise at least one coil-shaped groove in the cylindrical surface.

3. A method as recited in claim 1, wherein said contacting the structure with the first cutting tool of the cutting plate is divided into partial steps.

4. A method as recited in claim 1, wherein said method comprises material removal by cutting, and during cutting the surface is roughened and a microconfiguration in the form of at least one of the elements selected from the group consisting of microstructuring, microundercut, and microroughness is produced.

5. A method as recited in claim 1, wherein said cutting plate further comprises a cleaning tooth.

6. A method as recited in claim 1, wherein said forming at least the first groove is done with minimal quantity lubrication (MQL), or lubrication with a cooling/lubricating material selected from the group consisting of an oil-containing cooling/lubricating material, solid material-containing cooling/lubricating material, and water-containing cooling/lubricating material.

7. A method as recited in claim 1, wherein said contacting the structure with the second cutting tool of the cutting plate increases a bottom width of the first groove.

8. A method as recited in claim 1, wherein said contacting the structure with the second cutting tool of the cutting plate changes a shape of the first groove.

9. A method as recited in claim 1, wherein the second cutting tool of the cutting plate has a larger depth than the first cutting tool of the cutting plate.

10. A method as recited in claim 1, wherein the first groove has a substantially uniform geometry.

11. A method as recited in claim 1, wherein the surface is cylindrical and wherein the first groove has a substantially uniform geometry.

12. A method as recited in claim 1, wherein the surface is cylindrical and wherein the first groove extends at least one revolution about an axis of the cylindrical surface.

13. A method as recited in claim 1, wherein the surface comprises a plurality of regions, at least some of which substantially coincide with a cylindrical shape.

14. A method as recited in claim 1, wherein the surface is substantially cylindrical and the first groove is substantially helical.

15. A method as recited in claim 1, wherein the cutting plate further comprises at least a third portion, a fourth portion and a fifth portion that contact the structure.

16. A method as recited in claim 1, wherein the method further comprises:
rotating at least one of the surface and the cutting plate such that the surface rotates, relative to the first cutting tool of the cutting plate and the second cutting tool of the cutting plate, about a first axis, and
moving at least one of the surface and the cutting plate, such that the surface moves, relative to the first cutting tool of the cutting plate and the second cutting tool of the cutting plate, along the first axis.

17. A method as recited in claim 1, wherein:
the first cutting tool of the cutting plate is spaced from the second cutting tool of the cutting plate by a first pitch,
the method comprises rotating at least one of the surface and the cutting plate such that the surface rotates, relative to the first cutting tool of the cutting plate and the second cutting tool of the cutting plate, about a first axis while moving at least one of (1) the surface and (2) the cutting plate along the first axis, the moving resulting in changing the relative position of the surface relative to the cutting plate along the first axis, and
the rate of changing the relative position along the first axis of the surface relative to the cutting plate is equal to a product of: (1) the rate of rotating the surface relative to the cutting plate about the first axis times (2) the first pitch.

18. A method as recited in claim 17, wherein:
the method further comprises contacting the structure with at least a first displacement structure, the first displacement structure spaced from the second cutting tool of the cutting plate by a distance that differs from the first pitch.

19. A method as recited in claim 18, wherein the second cutting tool of the cutting plate contacts a first portion of the first groove before the first displacement structure displaces the first portion of the first groove.

20. A method as recited in claim 1, wherein:
the cutting plate further comprises a third cutting tool,
the first cutting tool of the cutting plate is spaced from the second cutting tool of the cutting plate by a first pitch,
the third cutting tool of the cutting plate is spaced from the first cutting tool of the cutting plate by a multiple of the first pitch.

21. A method for producing a surface that has a surface structure of predetermined geometry, that is suitable for application of material by thermal spraying and is in the form of a geometrically determined groove structure, the method comprising:
introducing a first groove into a surface of a structure, said surface cylindrical, by:
removing material from the structure by contacting the structure with at least a first cutting tool, and
plastically deforming part of the structure by applying blunt force by contacting the surface of the structure with at least a first displacement structure,
the first groove extending at least one revolution about an axis of the cylindrical surface.

22. A method as recited in claim 21, wherein the first groove is at least one coil-shaped groove in the cylindrical surface.

23. A method as recited in claim 21, wherein said introducing the first groove is divided into partial steps.

24. A method as recited in claim 21, wherein said introducing the first groove is realized in one working step that comprises different cutting and plastic deformation operations.

25. A method as recited in claim 21, wherein said method further comprises cleaning the first groove.

26. A method as recited in claim 21, wherein said method is done with minimal quantity lubrication (MQL), or lubrication with a cooling/lubricating material selected from the group consisting of an oil-containing cooling/lubricating material, solid material-containing cooling/lubricating material, and water-containing cooling/lubricating material.

27. A method as recited in claim 21, wherein the first groove has a substantially uniform geometry.

28. A method as recited in claim 21, wherein the first groove has a substantially uniform geometry.

29. A method as recited in claim 21, wherein said first groove is formed by or contacted with said first cutting tooth before said first groove is altered by said plastically deforming.

30. A method as recited in claim 29, wherein the plastically deforming part of the structure results in the first groove being an undercut groove.

31. A method as recited in claim 29, wherein said plastically deforming part of the structure plastically deforms the first groove, thereby constricting an opening of the first groove.

32. A method as recited in claim 21, wherein for at least a portion of said structure, said plastically deforming occurs before said removing material.

33. A method as recited in claim 21, wherein the surface comprises a plurality of regions, at least some of which substantially coincide with a cylindrical shape.

34. A method as recited in claim 21, wherein:
the first cutting tool and the first displacement structure are both on a first cutting plate, and
the method further comprises:
rotating at least one of the surface and the first cutting plate such that the surface rotates, relative to the first cutting tool of the first cutting plate and the first displacement structure of the first cutting plate, about a first axis, and
moving at least one of the surface and the first cutting plate such that the surface moves, relative to the first cutting tool of the first cutting plate and the first displacement structure of the first cutting plate, along the first axis.

35. A method as recited in claim 34, wherein the first groove is substantially helical.

36. A method as recited in claim 21, wherein:
the first cutting tool and the first displacement structure are both on a first cutting plate,
the first cutting plate further comprises at least a third portion, and
the method further comprises contacting the first groove with the third portion.

37. A method as recited in claim 36, wherein:
the first cutting tool and the first displacement structure are both on a first cutting plate, and
the first cutting plate further comprises at least a fourth portion and a fifth portion that contact the structure.

38. A method as recited in claim 21, wherein the surface is a surface of a bore in an engine block.

39. A method as recited in claim 21, wherein:
the first cutting tool and the first displacement structure are both on a first cutting plate,
the first cutting plate further comprises a third portion,
the third portion of the first cutting plate is a second cutting tool,
the third portion of the first cutting plate is spaced from the first cutting tool of the first cutting plate by a first pitch, and
the first displacement structure of the first cutting plate is spaced from the first cutting tool of the first cutting plate by a distance that differs from the first pitch.

40. A method as recited in claim 39, wherein the third portion of the first cutting plate contacts a first portion of the first groove before the first displacement structure of the first cutting plate deforms the first portion of the first groove.

41. A method as recited in claim 40, wherein:
the first cutting plate further comprises a fourth portion, and
the fourth portion of the first cutting plate is spaced from the third portion of the first cutting plate by the first pitch or a multiple of the first pitch.

42. A method as recited in claim 21, wherein:
the first cutting tool and the first displacement structure are both on a first cutting plate,
the first cutting plate further comprises a third portion,
the third portion of the first cutting plate is a second cutting tool, and
the third portion of the first cutting plate contacts a first portion of the first groove before the first displacement structure of the first cutting plate deforms the first portion of the first groove.

43. A method as recited in claim 21, wherein said first cutting tool and said displacement structure are both part of a first cutting plate that is a single unitary piece of material.

44. A method as recited in claim 21, wherein the first cutting tool and the first displacement structure are both on a first cutting plate.

45. A method for producing a surface that has a surface structure of predetermined geometry, that is suitable for application of material by thermal spraying and is in the form of a geometrically determined groove structure, the method comprising:
forming at least a first groove having a final cross-sectional contour in a surface of a structure by sequentially contacting locations on the surface of the structure with at least a first cutting tool and a second cutting tool of a cutting plate, the cutting plate is a single unitary piece of material comprising at least the first cutting tool and the second cutting tool, the first cutting tool is a first projection, the second cutting tool is a second projection, the first projection is separate from the second projection, the first projection is spaced from the second projection, said contacting locations on the surface of the structure with the first cutting tool causing material to be removed from the structure, the first groove having a first cross-sectional contour at each said location after said contacting the structure with the first cutting tool, said contacting the structure with the second cutting tool causing material to be removed from the structure, the first groove having a second cross-sectional contour at each said location after said contacting the structure with the second cutting tool,
the final cross-sectional contour comprising a portion of the first cross-sectional contour and a portion of the second cross-sectional contour,
wherein said method comprises plastically deforming the structure, thereby constricting an opening of the first groove.

46. A method for producing a surface that has a surface structure of predetermined geometry, that is suitable for application of material by thermal spraying and is in the form of a geometrically determined groove structure, the method comprising:
forming at least a first groove having a final cross-sectional contour in a surface of a structure by sequentially contacting locations on the surface of the structure with at least a first cutting tool and a second cutting tool of a cutting plate, the cutting plate is a single unitary piece of material comprising at least the first cutting tool and the second cutting tool, the first cutting tool is a first projection, the second cutting tool is a second projection, the first projection is separate from the second projection, the first projection is spaced from the second projection, said contacting locations on the surface of the structure with the first cutting tool causing material to be removed from the structure, the first groove having a first cross-sectional contour at each said location after said contacting the structure with the first cutting tool, said contacting the structure with the second cutting tool causing material to be removed from the structure, the first groove having a second cross-sectional contour at each said location after said contacting the structure with the second cutting tool, the final cross-sectional contour comprising a portion of the first cross-sectional contour and a portion of the second cross-sectional contour, wherein in said contacting locations on the surface of the structure with the first cutting tool of the cutting plate, the first groove is impressed into the surface by plastically deforming the structure.

47. A method for producing a surface that has a surface structure of predetermined geometry, that is suitable for application of material by thermal spraying and is in the form of a geometrically determined groove structure, the method comprising:

forming at least a first groove having a final cross-sectional contour in a surface of a structure by sequentially contacting locations on the surface of the structure with at least a first cutting tool and a second cutting tool of a cutting plate, the cutting plate is a single unitary piece of material comprising at least the first cutting tool and the second cutting tool, the first cutting tool is a first projection, the second cutting tool is a second projection, the first projection is separate from the second projection, the first projection is spaced from the second projection, said contacting locations on the surface of the structure with the first cutting tool causing material to be removed from the structure, the first groove having a first cross-sectional contour at each said location after said contacting the structure with the first cutting tool, said contacting the structure with the second cutting tool causing material to be removed from the structure, the first groove having a second cross-sectional contour at each said location after said contacting the structure with the second cutting tool, the final cross-sectional contour comprising a portion of the first cross-sectional contour and a portion of the second cross-sectional contour wherein the surface is cylindrical and wherein said method comprises forming with the cutting plate an intermediate groove in the surface between portions of the first groove so that undercut-like material deformations in the first groove are generated.

48. A method for producing a surface that has a surface structure of predetermined geometry, that is suitable for application of material by thermal spraying and is in the form of a geometrically determined groove structure, the method comprising:

introducing a first groove into a surface of a structure by:
removing material from the structure by contacting the structure with at least a first cutting tool, and
plastically deforming part of the structure by applying blunt force by contacting the surface of the structure with at least a first displacement structure, wherein the surface is cylindrical and wherein said method further comprises forming an intermediate groove in the cylindrical surface between portions of the first groove so that undercut-like material deformations in the first groove are generated.

49. A method for producing a surface that has a surface structure of predetermined geometry, that is suitable for application of material by thermal spraying and is in the form of a geometrically determined groove structure, the method comprising:

introducing a first groove into a surface of a structure by:
removing material from the structure by contacting the structure with at least a first cutting tool, and
plastically deforming part of the structure by applying blunt force by contacting the surface of the structure with at least a first displacement structure, the first cutting tool and the first displacement structure are both on a first cutting plate,
the first cutting plate further comprises a third portion,
the third portion of the first cutting plate is a cutting tool,
the first cutting tool is spaced from the third portion of the first cutting plate by a first pitch,
the method comprises rotating at least one of the surface and the first cutting plate such that the surface rotates, relative to the first cutting tool of the first cutting plate and the first displacement structure of the first cutting plate, about a first axis while moving at least one of (1) the surface and (2) the first cutting plate along the first axis, the moving resulting in changing the relative position along the surface relative to the first cutting plate, and
the rate of changing the relative position along the first axis of the surface relative to the first cutting plate is equal to a product of: (1) the rate of rotating the surface relative to the first cutting tool and the first displacement structure about the first axis times (2) the first pitch.

50. A method for producing a surface that has a surface structure of predetermined geometry, that is suitable for application of material by thermal spraying and is in the form of a geometrically determined groove structure, the method comprising:

forming at least a first groove in a surface of a structure by contacting the structure with at least a first portion and a second portion of a cutting plate, the cutting plate a single unitary piece of material comprising at least the first portion and the second portion, and
plastically deforming the structure, thereby constricting an opening of the first groove.

51. A method as recited in claim 50, wherein:
the first groove has a final contour, and
each of at least the first portion of the cutting plate and the second portion of the cutting plate produce part of the final contour.

52. A method for producing a surface that has a surface structure of predetermined geometry, that is suitable for application of material by thermal spraying and is in the form of a geometrically determined groove structure, the method comprising:

forming at least a first groove in a surface of a structure by contacting the structure with at least a first portion and a second portion of a cutting plate, the cutting plate a single unitary piece of material comprising at least the first portion and the second portion,
wherein in said contacting the structure with the first portion of the cutting plate, the first groove is impressed into the surface by plastically deforming the structure.

53. A method as recited in claim 52, wherein:
the first groove has a final contour, and
each of at least the first portion of the cutting plate and the second portion of the cutting plate produce part of the final contour.

54. A method for producing a surface that has a surface structure of predetermined geometry, that is suitable for application of material by thermal spraying and is in the form of a geometrically determined groove structure, the method comprising:

forming at least a first groove in a surface of a structure by contacting the structure with at least a first portion and a second portion of a cutting plate, the cutting plate a single unitary piece of material comprising at least the first portion and the second portion, said forming at least the first groove is realized in one working step that comprises different cutting and plastic deformation operations.

55. A method as recited in claim 54, wherein:

the first groove has a final contour, and each of at least the first portion of the cutting plate and the second portion of the cutting plate produce part of the final contour.

56. A method for producing a surface that has a surface structure of predetermined geometry, that is suitable for application of material by thermal spraying and is in the form of a geometrically determined groove structure, the method comprising:

forming at least a first groove in a surface of a structure by contacting the structure with at least a first portion and a second portion of a cutting plate, the cutting plate a single unitary piece of material comprising at least the first portion and the second portion, forming with the cutting plate an intermediate groove in the surface between portions of the first groove so that undercut-like material deformations in the first groove are generated.

57. A method as recited in claim 56, wherein:

the first groove has a final contour, and each of at least the first portion of the cutting plate and the second portion of the cutting plate produce part of the final contour.

58. A method as recited in claim 57, wherein said surface is cylindrical.

59. A method for producing a surface that has a surface structure of predetermined geometry, that is suitable for application of material by thermal spraying and is in the form of a geometrically determined groove structure, the method comprising:

introducing with a first portion of a cutting plate a first groove into a surface of a structure, processing at least a portion of the first groove with at least a second portion of the cutting plate, and forming with the cutting plate an intermediate groove in the surface between portions of the first groove so that undercut-like material deformations in the first groove are generated, one of the first portion and the second portion of the cutting plate a cutting tool that causes material to be removed from the structure, the other of the first portion and the second portion of the cutting plate a displacement structure that plastically deforms part of the structure by applying blunt force.

60. A method as recited in claim 59, wherein said surface is cylindrical.

61. A method for producing a surface that has a surface structure of predetermined geometry, that is suitable for application of material by thermal spraying and is in the form of a geometrically determined groove structure, the method comprising:

introducing with a first portion of a cutting plate a first groove into a cylindrical surface of a structure, the first groove extends at least one revolution about an axis of the cylindrical surface, and subsequently processing at least a portion of the first groove with at least a second portion of the cutting plate, one of the first portion and the second portion of the cutting plate a cutting tool that causes material to be removed from the structure, the other of the first portion and the second portion of the cutting plate a displacement structure that plastically deforms part of the structure by applying blunt force.

62. A method for producing a surface that has a surface structure of predetermined geometry, that is suitable for application of material by thermal spraying and is in the form of a geometrically determined groove structure, the method comprising:

introducing with a first portion of a cutting plate a first groove into a surface of a structure, processing at least a portion of the first groove with at least a second portion of the cutting plate, rotating at least one of the surface and the cutting plate such that the surface rotates, relative to the first portion of the cutting plate and the second portion of the cutting plate, about a first axis while moving at least one of (1) the surface and (2) the cutting plate along the first axis, the moving resulting in changing the relative position along the surface relative to the cutting plate, the first portion of the cutting plate is a cutting tool that causes material to be removed from the structure, the second portion of the cutting plate is a displacement structure that plastically deforms part of the structure by applying blunt force, the cutting plate further comprising a third portion, the third portion of the cutting plate is a cutting tool, the first portion of the cutting plate is spaced from the third portion of the cutting plate by a first pitch, the rate of changing the relative position along the first axis of the surface relative to the cutting plate is equal to a product of: (1) the rate of rotating the surface relative to the cutting plate about the first axis times (2) the first pitch.

63. A method for roughening a surface of a structure, the method comprising:

rotating at least one of a structure and a cutting plate such that the surface of the structure rotates, relative to the first portion of the cutting plate and the second portion of the cutting plate, about a first axis, the cutting plate a single unitary piece of material comprising at least a first portion and a second portion, moving at least one of the structure and the cutting plate, such that the surface of the structure moves, relative to the cutting plate, along the first axis, the moving resulting in changing the relative position of the surface relative to the cutting plate along the first axis, said rotating and said moving resulting in:

at least the first portion and the second portion of the cutting plate forming at least a first groove in the surface of the structure, and the structure contacting a displacement feature to plastically deform part of the structure, the displacement feature a portion of the cutting plate, the plastically deforming the structure causing a change in the shape of the first groove.

64. A method as recited in claim 63, wherein:

the first portion of the cutting plate is spaced from the second portion of the cutting plate by a first pitch, and the rate of changing the relative position along the first axis of the surface relative to the cutting plate is equal to a product of: (1) the rate of rotating the surface relative to the cutting plate about the first axis times (2) the first pitch.

* * * * *

UNITED STATES PATENT AND TRADEMARK OFFICE
CERTIFICATE OF CORRECTION

PATENT NO. : 9,643,265 B2  
APPLICATION NO. : 12/362528  
DATED : May 9, 2017  
INVENTOR(S) : Holger Ast et al.

Page 1 of 1

It is certified that error appears in the above-identified patent and that said Letters Patent is hereby corrected as shown below:

In the Specification

Column 5, Line 52:
Please change: "cut-like groove, can be produced by material displacement." to -- cut-like groove can be produced by material displacement. --

Column 5, Line 58:
Please change: "the at least one groove generated previouslywith the same" to -- the at least one groove generated previously with the same --

Column 7, Line 9:
Please change: "In the embodiment wherein the cutting insert is positively" to -- In the embodiment wherein the cutting insert is secured positively --

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*